United States Patent [19]

Arai et al.

[11] Patent Number: 4,805,991
[45] Date of Patent: Feb. 21, 1989

[54] MULTI-LAYER RESIN MOLDED ARTICLE AND METHOD OF MAKING THE SAME

[75] Inventors: Takashi Arai, Tokyo; Katsuo Kawano, Kawasaki; Hidekazu Okajima, Yokohama, all of Japan

[73] Assignee: Canon Kabushiki Kaisha, Tokyo, Japan

[21] Appl. No.: 22,210

[22] Filed: Mar. 5, 1987

[30] Foreign Application Priority Data

| Mar. 13, 1986 | [JP] | Japan | 61-55266 |
| Apr. 1, 1986 | [JP] | Japan | 61-75142 |
| Jun. 12, 1986 | [JP] | Japan | 61-90158[U] |
| Sep. 18, 1986 | [JP] | Japan | 61-221135 |
| Dec. 1, 1986 | [JP] | Japan | 61-286243 |
| Dec. 1, 1986 | [JP] | Japan | 61-286244 |
| Dec. 18, 1986 | [JP] | Japan | 61-302294 |

[51] Int. Cl.$^4$ .............................................. G02B 7/04
[52] U.S. Cl. ........................... 350/255; 264/328.8; 350/252
[58] Field of Search ............... 350/255, 320, 417, 252, 350/254; 354/484; 264/328.8, DIG. 57; 339/389, 393, 415, 426, 429

[56] References Cited

U.S. PATENT DOCUMENTS

| 2,996,764 | 8/1961 | Ross et al. |
| 3,599,290 | 8/1971 | Garner | 264/DIG. 57 |
| 3,690,797 | 9/1972 | Garner | 425/126 |
| 3,873,656 | 3/1975 | Garner | 264/328.8 |
| 4,103,984 | 8/1978 | Mixon, Jr. | 439/415 |
| 4,174,876 | 11/1979 | Tsuchihashi et al. | 439/426 |
| 4,309,077 | 1/1982 | Tomori | 350/255 |
| 4,560,237 | 12/1985 | Ohkura et al. | 350/255 |

FOREIGN PATENT DOCUMENTS

| 3123745 | 3/1982 | Fed. Rep. of Germany | 350/255 |
| 78108 | 5/1983 | Japan | 350/255 |
| 32011 | 2/1985 | Japan | 350/255 |
| 2114 | 1/1986 | Japan | 350/255 |
| 792369 | 12/1980 | U.S.S.R. | 439/426 |

Primary Examiner—John K. Corbin
Assistant Examiner—Martin Lerner
Attorney, Agent, or Firm—Fitzpatrick, Cella, Harper & Scinto

[57] ABSTRACT

When making a generally cylindrical article such as the barrel member of a lens barrel into a cylindrical molded article by the use of a resin material, a sandwich-molded article is formed by using a core layer resin material for the central layer of the molded article and surrounding the central layer by a skin layer resin material, the cylindrical molded article is a helicoid cylinder constituting the barrel, or a cylinder member provided with a toothed portion for receiving a drive force, or other barrel-constituting member, and the thickness of the skin layer resin material of the toothed portion of the helicoid cylinder or the barrel-constituting member is controlled.

3 Claims, 14 Drawing Sheets

FIG. 8B1
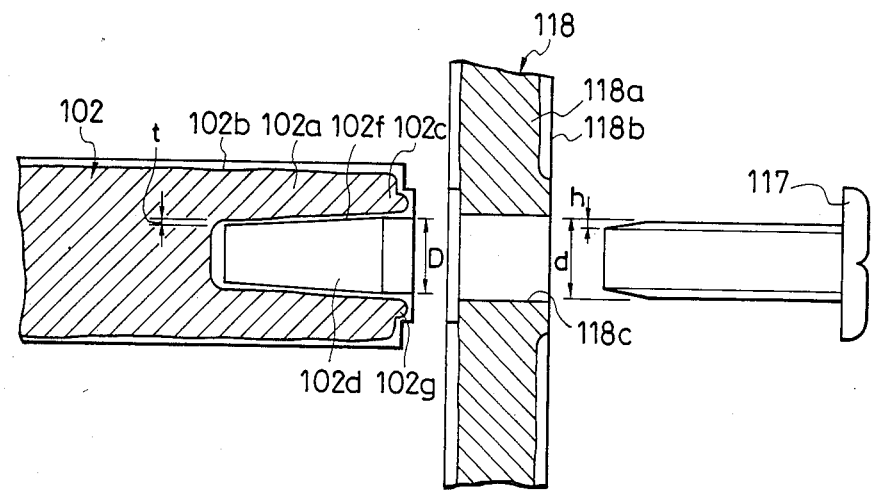
FIG. 8B2
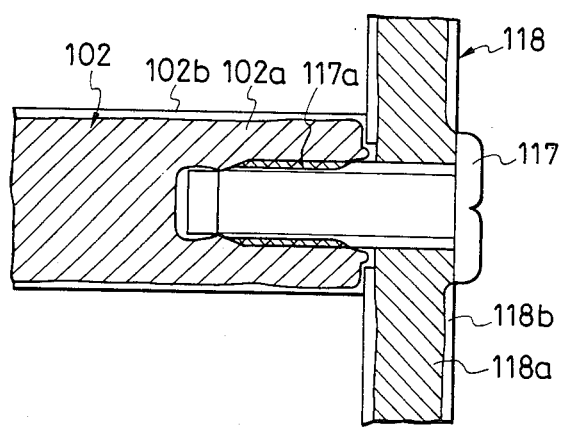

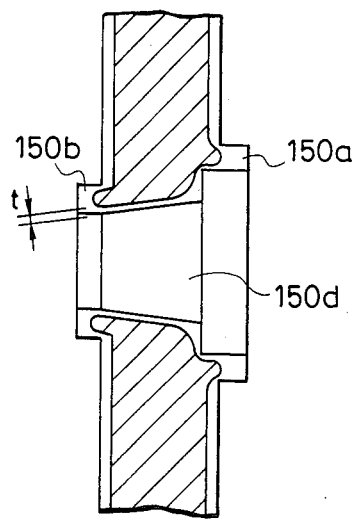
FIG. 8C1
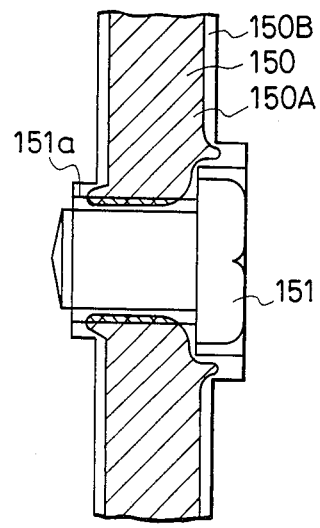
FIG. 8C2
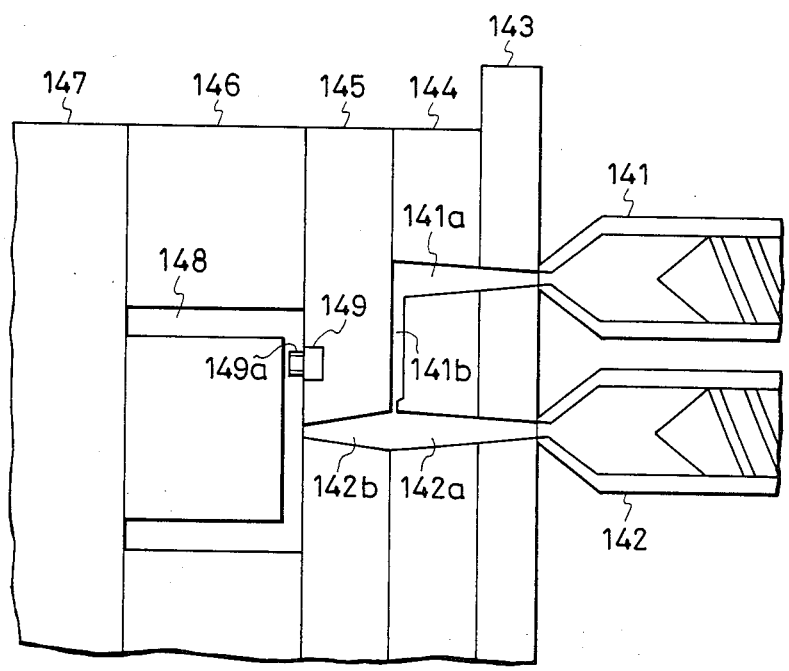
FIG. 8D1

FIG. 8D2
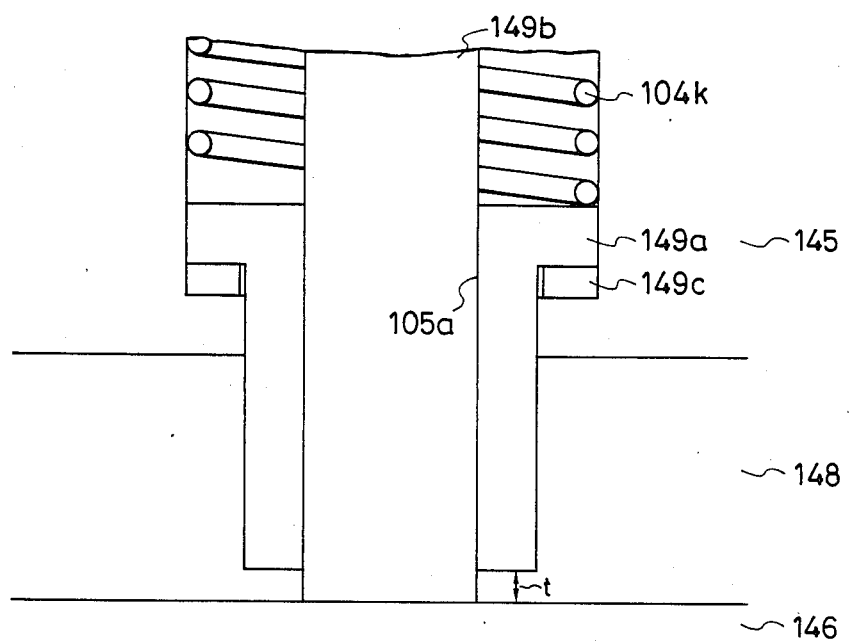
FIG. 8D3
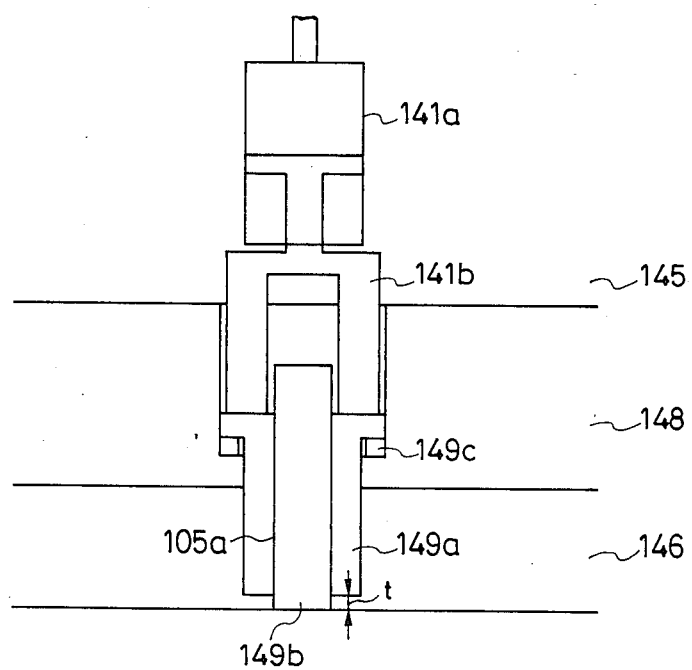

FIG. 8E1
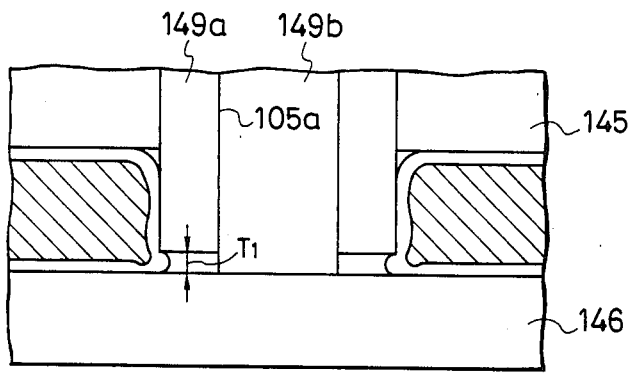
FIG. 8E2
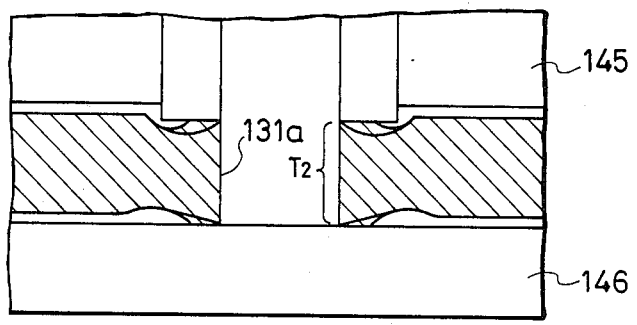
FIG. 8F
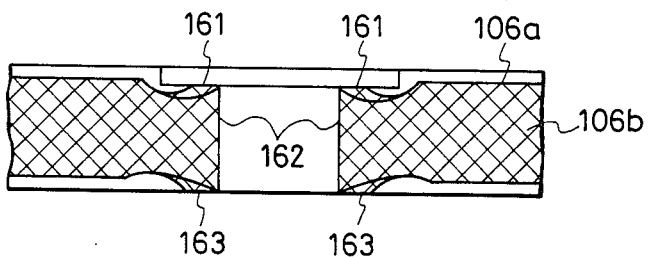

FIG. 8G1
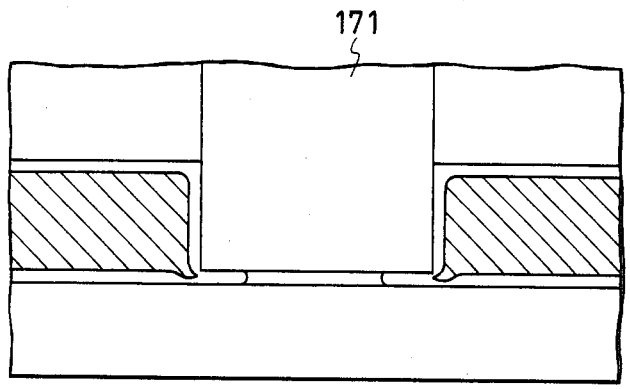
FIG. 8G2
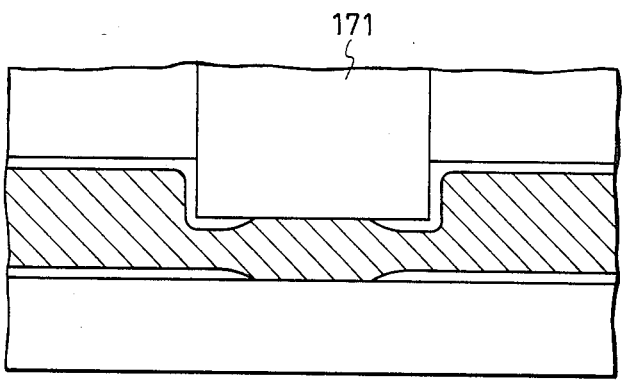
FIG. 8G3
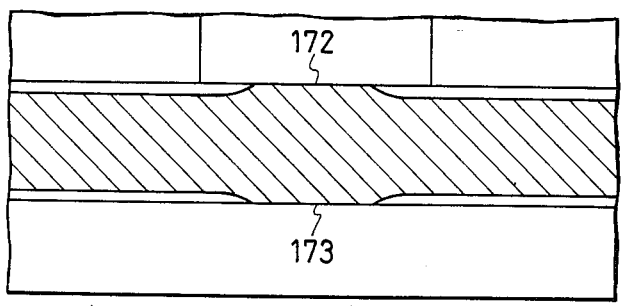

MULTI-LAYER RESIN MOLDED ARTICLE AND METHOD OF MAKING THE SAME

BACKGROUND OF THE INVENTION

1. Field of the Invention

This invention relates to a multi-layer resin molded article formed by sandwich molding, and to a method of making the same.

2. Related Background Art

As the construction of a lens barrel, there is known a construction which has a lens, a lens holding frame, a fixed cylinder, an intermediate cylinder, an operating ring, etc. and in which the lens holding frame is moved and controlled in a direction parallel to the optic axis by rotation of the operating ring about the optic axis through the intermediate cylinder. As the construction of the intermediate cylinder, there is known a helicoid cylinder provided with helocoid portions on the inner and outer peripheries thereof to convert the rotational force of the operating ring about the optic axis into movement of the lens holding frame parallel to the optic axis. In the case of a lens barrel, the use of a metal material such as aluminum (Al) or brass (Bs) results in physical excellence, while on the other hand it leads to numerous problems such as heavy weight, high cost resulting from machining of the metal, and limited productivity. Injection molding of resin materials instead of metal materials has also been practised. As a resin material suitable for the helicoid cylinder, there is known polycarbonate, ABS, polybutylene terephthalate (PBT), denatured polyphenylene oxide, polyacetal or the like, and further, use has been made of resin materials having glass fiber or carbon fiber mixed therewith to increase the resin strength.

The polycarbonate material having glass fiber mixed therewith can provide a helicoid cylinder guaranteed in reduced cost, high accuracy and mechanical strength, but it still leaves a problem that the glass fiber is exposed on the inner and outer peripheral surfaces of the helicoid cylinder, whereby an improvement is required in the slidability of inner and outer cylinders slidably fitted to the helicoid cylinder.

A solution of the above-noted problem can be achieved by making the cylinder member into a multi-layer structure. For example, by the sandwich molding (hereinafter referred to as the SW molding) described in Japanese Patent Publication No. 28464/1975, U.S. Pat. No. 3,809,519, U.S. Pat. No. 3,599,290, U.S. Pat. No. 3,733,156 and U.S. Pat. No. 3,873,656, a resin material with no glass fiber mixed therewith for forming the surface layer of the helicoid cylinder is first poured into the cavity of a metal mold for molding the helicoid cylinder, and then a resin material with glass fiber mixed therewith for forming the core is poured into the cavity, whereby there can be provided a helicoid cylinder having a smooth surface layer of resin and a core of resin of great mechanical strength.

SUMMARY OF THE INVENTION

The present invention provides a barrel member excellent in mechanical and physical characteristics by resin-molding into a multi-layer structure a lens barrel for holding an optical part and moving the optical part for the purpose of optical action.

Further, the present invention provides a helicoid cylinder or a rotational ring for transmitting a rotational force or a drive force in which the helicoid toothed portion and the meshing portion are increased in strength and which is excellent in meshing lubricity.

Furthermore, the present invention intends to provide a multi-layer resin molded article in which the transmission density of the core layer resin material has been changed by changing the thickness dimension of the skin layer resin material of the sandwich molding, and to provide an apparatus for molding the molded article.

Still further, the present invention intends to provide a multi-layer resin molded article which is constructed by the sandwich molding method so as to have as a layer structure a core layer having electrical conductivity and an insulative skin layer covering the surface thereof and in which electrical conduction between the core layer of the molded article and other member can be automatically attained accompanying other members can be achieved.

BRIEF DESCRIPTION OF THE DRAWINGS

FIGS. 8A-8G3 show examples of the molded article such as a barrel part in which electrical conduction can be secured, FIG. 8A schematically showing an example of the construction of the lens barrel of a camera incorporating therein a molded article according to the present invention, FIGS. 8B1 and 8B2 illustrating the state when a screw member is screwed into the screw-threading lower hole of the molded article according to the present invention, FIGS. 8C1 and 8C2 illustrating the state when a screw member is screwed into the screw-threading lower hole of another example of the molded article according to the present invention, FIG. 8D1 being a cross-sectional view schematically showing the construction of an example of the metal mold apparatus used in the method of the present invention, FIGS. 8D2 and 8D3 showing the structure of a movable pin unit, FIGS. 8E1 and 8E2 illustrating the movement of the movable pin of the metal mold apparatus shown in FIG.

Figure 1:
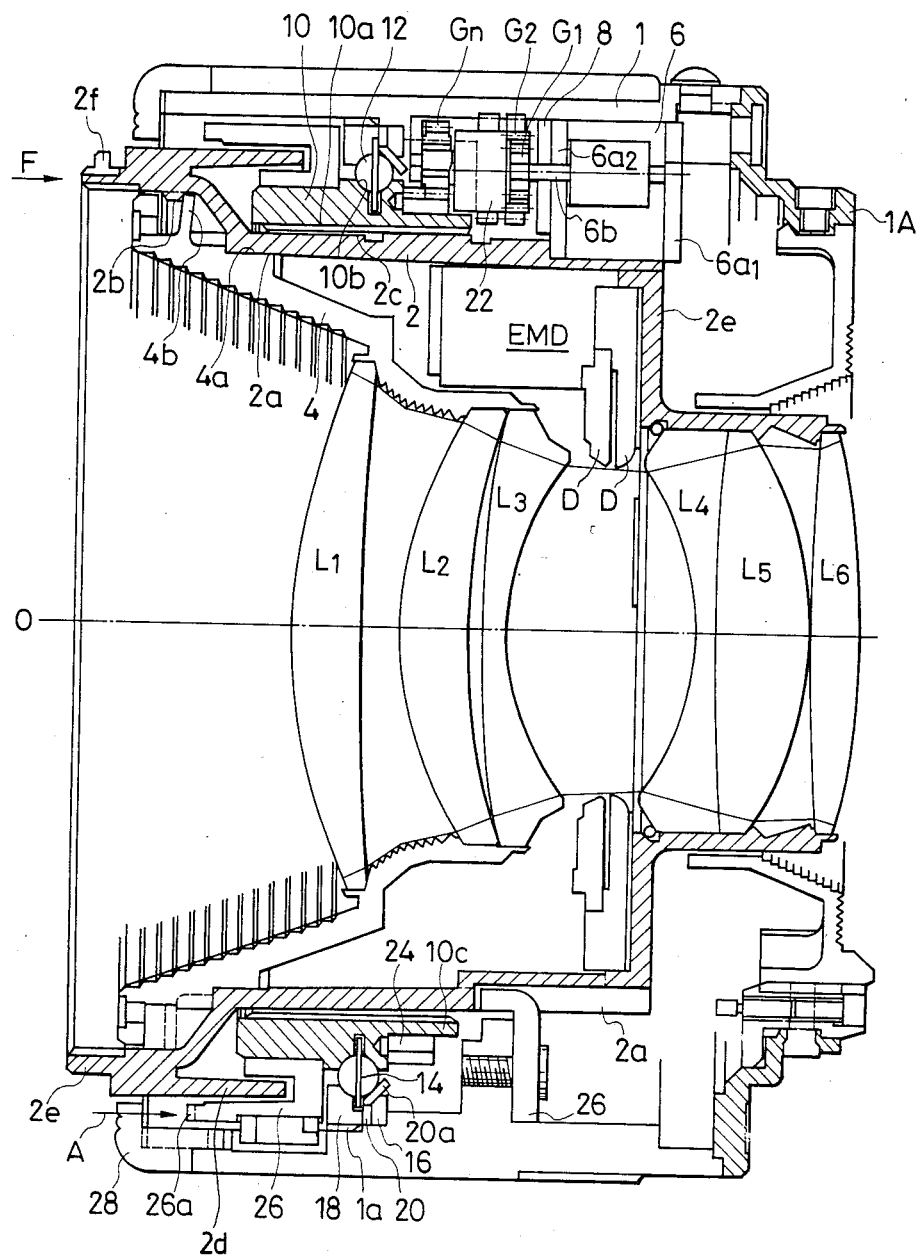
FIG. 1 is a cross-sectional view of a lens barrel to which the present invention is applied.

8D1, FIG. 8F showing the state of the exposed portions of the core layer of a molded article molded by the apparatus of FIGS. 8E1 and 8E2, and FIGS. 8G1, 8G2 and 8G3 illustrating the movement of another example of the movable pin of the metal mold apparatus shown in FIG. 8D1.

DESCRIPTION OF THE PREFERRED EMBODIMENTS

The structure of FIG. 1, for example, is shown as a lens barrel structure in which an optical member such as a lens is held at a predetermined location within the lens barrel and the optical member is moved for focusing action, magnification changing action, etc.

In FIG. 1, reference numeral 1 designates a fixed cylinder. A bayonet mount 1A coupled to a camera, not shown, is attached to one end of the fixed cylinder 1 which is adjacent to the camera.

Reference numeral 2 denotes a first movable ring, and reference numeral 4 designates a second movable ring. Focusing lenses L4-L6 and L1-L3 are held within the first and second movable rings 2 and 4, respectively. The outer peripheral surface of the second movable ring 4 has a mating portion 4a fitted to the inner diameter portion 2a of the first movable ring 2, and fixing means for fixing the second movable ring 4 to the first movable ring 2. The fixing means engages a plurality of projections 4b projected on the outer periphery of the second movable ring 4 with engaging portions 2b provided on the inner diameter surface of the first movable ring 2.

Reference numeral 6 denotes a motor held in the fixed cylinder 1. The motor 6 comprises a stator comprising yokes $6a_1$ and $6a_2$, a permanent magnet (not shown), etc. fixed to the fixed cylinder 1, and a rotor comprising a coil, a rotary shaft 6b, etc.

G1-Gn designate a group of gears connected to the rotary shaft 6b and constituting a gear mechanism for increasing and decreasing the number of revolutions. The group of gears is supported by a ground plate fixed to the fixed cylinder 1.

Reference numeral 10 designates a rotatable ring rotated at a predetermined position in the fixed cylinder 1. The inner diameter of the rotatable ring 10 is provided with a helicoid portion 10a threadably engaged with a helicoid portion 2c formed on the outer periphery of the first movable ring 2, and the outer periphery of the rotatable ring 10 is formed with a V-shaped ball race groove 10b for receiving ball bearings 12.

The ball bearing 12 are disposed in the ball race groove 10b of the rotatable ring 10 continuously with one another by ball spacers 14 or at predetermined intervals provided by the ball spacers 14, and are held by a first ball receiving ring 16 fitted in the inner periphery of the fixed cylinder 1 and a second ball receiving ring 18 threadably engaged with a threaded portion 1a on the inner surface of the fixed cylinder 1.

Reference numeral 20 designates a plate-like spacer supported by the first and second ball receiving rings 16 and 18 and having the free end thereof bent along the inclined surface of the first ball receiving ring 16, and the spacer 20 adjusts its pressing against the balls 12 by the bent portion 20a thereof. Reference numeral 22 denotes a position detector such as an encoder disposed in the aforementioned gear mechanism.

A portion of the outer periphery of the rotatable ring 10 is reduced in diameter, and a gear ring 24 is fixed to the outer periphery of the reduced diameter portion 10c and is in meshing engagement with the output gear of the aforementioned gears G1-Gn.

In the above-described construction, a space is formed between the movable ring 2 and the fixed cylinder 1 so as to be able to contain the motor 6 and the gear mechanism G1-Gn therein, and this space is kept by the bearing constituting members 10, 16 and 18 of the balls 12 fixed between the fixed cylinder 1 and the movable ring 2.

D designates a diaphragm unit fixed to the inner peripheral surface of the movable ring 2 and to the wall surface 2c of the reduced diameter portion, and EMD denotes a motor for driving the diaphragm unit D. The motor EMD is fixed to the inner peripheral surface of the movable ring 2.

(Operation of the Lens Barrel)

The present lens barrel is mounted onto a camera, not shown, and a motor driving circuit is operated by focusing control means provided in the camera, to thereby drive the motor 6. The resolutional force of the motor 6 is transmitted to the rotatable ring 10 via the gear mechanism G1-Gn, so that the rotatable ring 10 is rotated in place by bearing means. The rotation of the rotatable ring 10 is transmitted to the movable ring 2 helicoid-coupled thereto, and since a key member 26 extending from the fixed cylinder 1 is engaged with the rectilinear key way 2d on the outer periphery of the movable ring 2, the movable rings 2 and 4 are rectilinearly moved in a direction parallel to the optic axis O, whereby movement of the lenses L1-L6 is accomplished.

In the lens barrel shown in FIG. 1, the movable ring 2 is threadably engaged with the rotatable ring 10 by means of helicoid, and further, one end of the movable ring 2 which is adjacent to the object side protrudes from other members such as the second movable ring 4, the fixed cylinder 1 and a dress ring 28, and the outer periphery of the protruding portion 2f thereof is provided with a mounting portion for mounting accessories such as a hood and a filter thereon.

The movable ring 2 of the construction as shown in FIG. 1 wherein the movable ring 2 is helicoid-coupled to the rotatable member 10 and one end thereof protrudes is subject to a shock resulting from an extraneous force F and the helicoid portion 2c may be damaged by the extraneous force to harm the smoothness of movement of the movable ring 2 and derange the accuracy of focusing of the focusing lenses L1-L6. Such problem remarkably arises particularly when the movable ring is molded with a resin material in conformity with the recent tendency of the lens barrel to positively employ a synthetic resin material for the components thereof.

FIGS. 2 to 4C show a first embodiment of the present invention. In the present embodiment, in molding the movable ring with a resin material, when the resin is poured into the cavity in the metal mold of a molding plate, the central layer of the cylinder portion in the cross-section structure of the movable ring is made of a core layer resin material having mechanical strength and the surface layer is made of a skin layer resin material having lubricity, and particularly the thicknesses of the resin materials of the skin layer and core layer of the meshing surfaces of the toothed portion (the inclined surfaces on the opposite sides of the summit of the toothed portion) of the helicoid which meshes with the rotatable ring are made to differ from each other, thereby avoiding the above-noted problem caused by the shock resulting from the aforementioned extraneous force.

Figure 2:
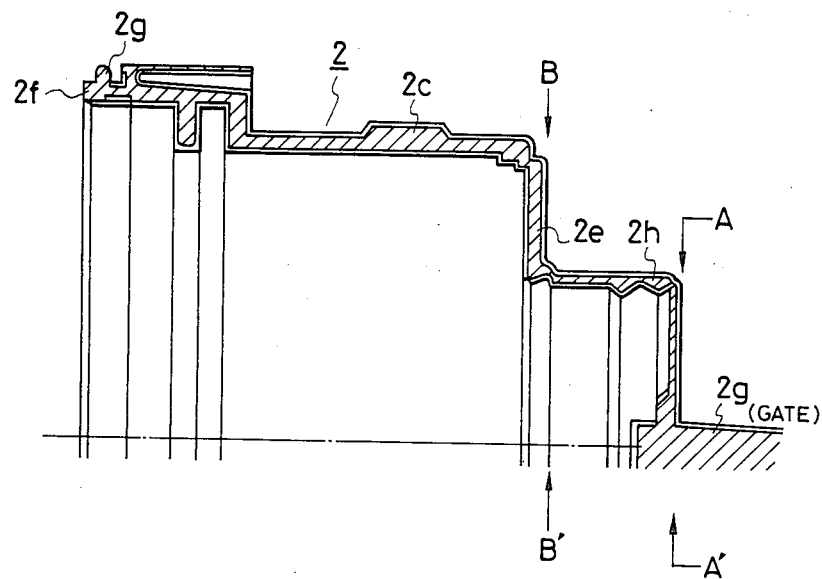
FIG. 2 is a cross-sectional view showing the sandwich-molded structure of a movable ring.

FIG. 2 shows the cross-section of the axially upper portion of the movable ring 2. The central portion (the portion indicated by hatching) of the cross-section of the movable ring 2 is made of a core layer resin material of high physical strength consisting of polycarbonate having glass fiber mixed therewith, and the white portion around the central portion is made of polycarbonate or polyacetal to keep the lubricity of the surface with the smoothness of threadable engagement of the helicoid portion and the contact thereof with other members being taken into account.

Figure 3:
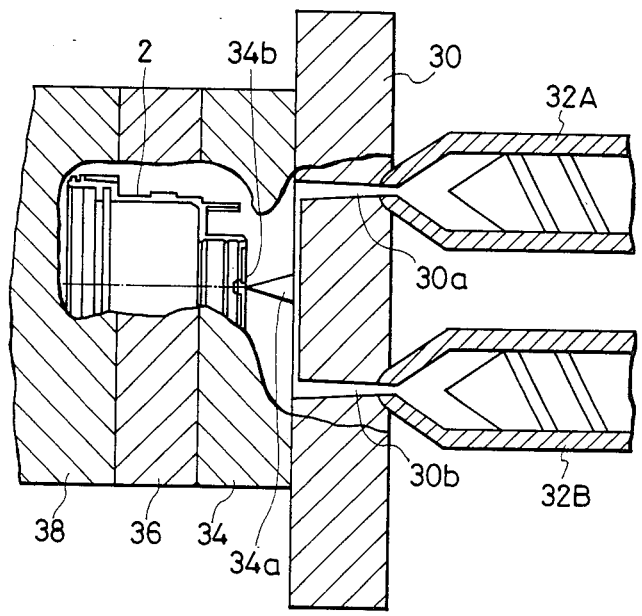
FIG. 3 is a cross-sectional view of the essential portions of a molding apparatus.

FIG. 3 shows a molding apparatus for sandwich molding of the movable ring 2 shown in FIG. 2. In the molding apparatus of FIG. 3, reference numeral 30 designates a fixed plate having sprues 30a and 30b connected to a first injection cylinder 32A for injecting a skin layer resin material and a second injection cylinder 32B for injecting a core layer resin material. Reference numeral 34 denotes a runner plate having a runner 34a, and reference numerals 36 and 38 designate metal molds provided with molding clearances.

A gate 34b through which molten resin is poured from the runner plate 34 into the molding clearances is a disc gate provided at the center 2g of a surface closing the fore end of the lens holding frame portion of the molded article of FIG. 2.

The operation and molding action of the apparatus shown in FIG. 3 will now be described.

A predetermined amount of skin material S is first poured from the first injection cylinder 32A into the clearances via the sprues, the runner and the gate. Polycarbonate resin is used as the skin material S. After the predetermined amount of skin material S has been poured, a core material C is poured in from the second injection cylinder through a gate A. By the core material C being thus poured in, the skin material S previously poured into the clearances is urged against the peripheral walls of the clearances by the core material C and is forced out from a lens holding frame portion 2h to a well portion 2e.

The molding action will now be described in detail with reference to FIGS. 4A, 4B and 4C.

Figure 4A:
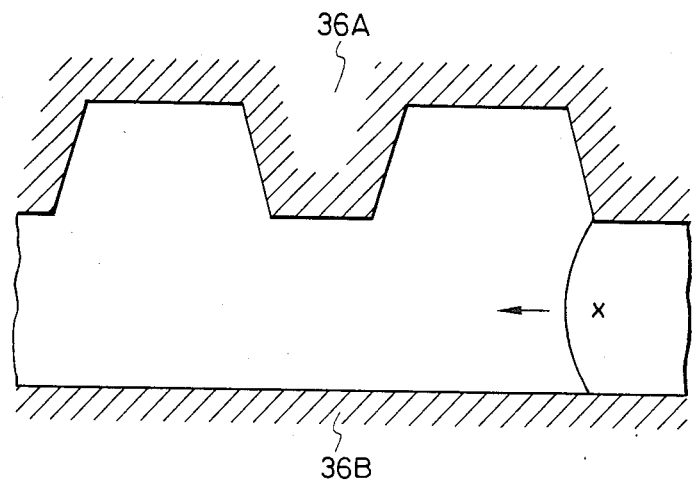
FIGS. 4A, 4B and 4C illustrate the molding action.

Reference characters 36A and 36B in FIG. 4A designate metal mold members for forming a cavity for molding the helicoid portion 2c of the movable ring 2.

Figure 4B:
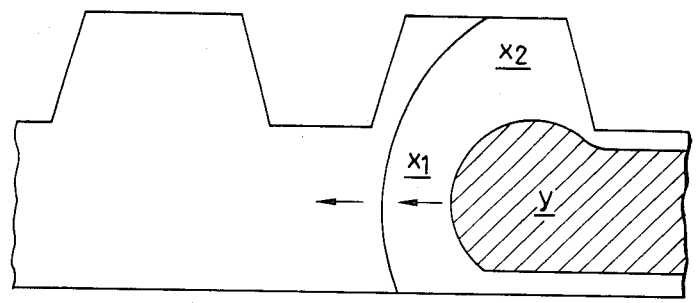

The skin layer material x poured in from the gate as previously described advances in the cavity by being pushed by the core layer material y, and the skin layer material x is urged against the tooth surface of the helicoid tooth portion of the metal mold member 36A (FIG. 4B).

The temperature of the metal mold member is considerably low as compared with the temperature of the skin layer material x and therefore, the skin layer material which has contacted the surface of the metal mold begins to be cooled and solidified from the surface thereof which is in contact with the metal mold, with lapse of time. As the cooling and solidification of the skin layer material progresses, the viscosity thereof increases and finally, the skin layer material reaches its solidification temperature and is thus solidified.

In FIG. 4B, comparing the skin layer materials $x_1$ and $x_2$. the skin layer material lying at the position $x_1$ is not in contact with the metal mold and therefore, the temperature thereof is high and the viscosity thereof is low. In contrast, the skin layer material $x_2$ is in contact with the metal mold therefore, the viscosity thereof is high and the surface thereof which is in contact with the metal mold already begins to solidify.

Since the skin layer materials $x_1$ and $x_2$ are in such states, the pressure for the core layer material y to advance is applied mostly to the $x_1$ side of small resistance and is hardly applied to the $x_2$ side.

Figure 4C:
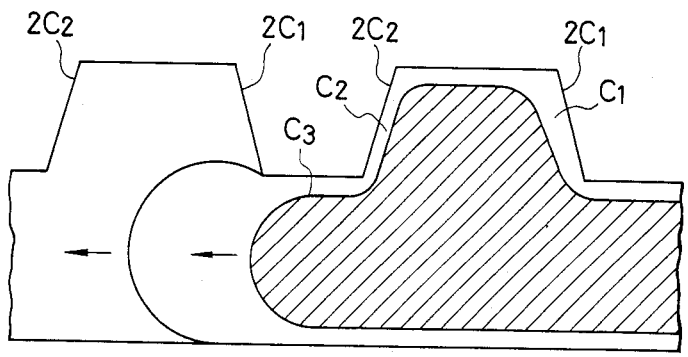

Accordingly, when it shifts from the state of FIG. 4B to the state of FIG. 4C, the skin layer material $x_2$ is not pressed and stretched by the pressure of the core layer material y, but stagnates as indicated at $c_1$ in FIG. 4C and the skin layer becomes thicker.

In contrast, the skin layer material $x_1$ of FIG. 4B is subjected to the pressure of the core layer material y as previously mentioned and the viscosity thereof is low and therefore, when it assumes the state of FIG. 4C, almost all of the resin except the surface of the resin which is in contact with the metal mold is washed away to the $c_3$ side in FIG. 4C. Thus, the skin layer material $c_2$ becomes considerably thin.

The state as described above is continuously repeated in the process of flow of the resin and as a result, the thickness of the skin layer can be changed on the $2c_2$ side which is subjected to the extraneous force and on the opposite $2c_1$ side.

According to the present invention, as described above, the cylinder member having the helicoid tooth portion is sandwich-molded, and the thicknesses of the skin layer resin on the forward helicoid inclined surface and the rearward helicoid inclined surface of the helicoid tooth portion are made different from each other, and particularly the thickness of the helicoid inclined surface in the direction in which a shock is exerted on the helicoid is made thin so that the shock is received by not the skin layer resin but the core layer resin, whereby the damage of the helicoid tooth portion can be prevented and the smoothness and optical accuracy of the operation of each member of the lens barrel can be ensured.

Figure 5A:
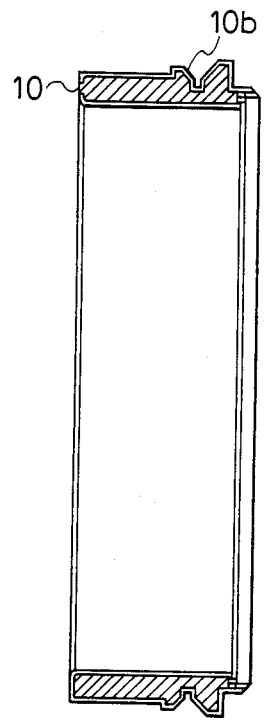
FIG. 5A shows the molded state of a rotational member according to the present invention.
Figure 5B:
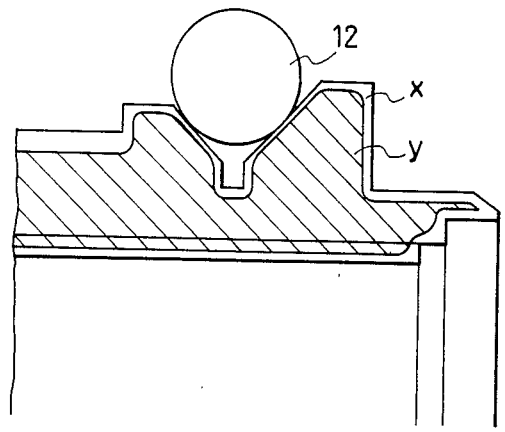
FIG. 5B illustrates the rotational member and a bearing ball.
Figure 5C:
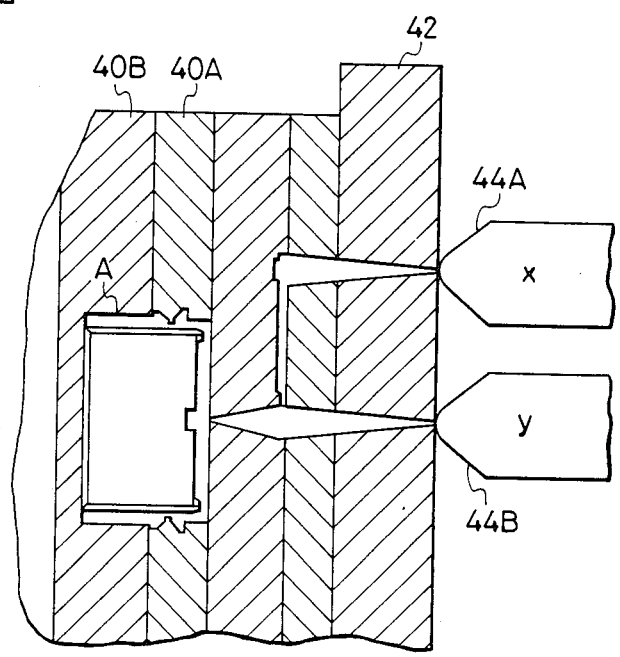
FIG. 5C illustrates the molding state.

FIGS. 5A, 5B and 5C show an embodiment which solves the aforementioned problem by sandwich molding in a case where a rotatable member which directly receives the drive force from the drive source for the rotatable ring 10, etc. and which directly affects the optical performance of an optical element such as a lens is formed into a component of bearing means by sandwich molding and plays the role of supporting the bearing balls.

FIG. 5A is a cross-sectional view of the rotatable ring 10 shown in FIG. 1, FIG. 5B shows an enlarged view of the ball race portion of the rotatable ring 10 as it holds the ball, and FIG. 5C shows the step of molding.

As shown in FIG. 5C, a cavity A for molding the rotatable ring 10 is provided in the metal molds 40A and 40B of the molding apparatus, and injection devices 44A and 44B for injecting the skin layer resin material x and the core layer resin material y, respectively, are attached to a template 42. The core layer resin material y is endowed with severe conditions that the rotatable ring 10 has the function of receiving the drive force from the motor 6 and transmitting the force to the movable ring 2 through the helicoid 2c and that it forms part of the bearing means and strictly requires dimensional accuracy. For this purpose, the use of polycarbonate resin enriched by glass fiber or carbon fiber which has a small in mold shrinkage rate and a high coefficient of thermal expansion in bending strength and rigidity is preferred.

Also, the skin layer resin material x needs to cover the surface of the ball race 10b of the rotatable ring 10 and enhance the smoothness of rotation of the bearing balls 12 and minimize the wear of the balls 12. For this reason, the skin layer resin material x may preferably be said resin having added thereto a material which is excellent in wear resistance and slidability and has such a degree of strength that it is not deformed by the surface pressure from the ball bearings, such as polyacetal or polycarbonate or fluorine resin.

As described above, according to the present invention, at least the groove portion of the rotatable member having in the inner or outer periphery thereof a groove portion (ball race surface) supporting the bearing balls which support the rotatable member is made into a sandwich-molded structure in which the surface of the groove portion is formed of the skin layer resin material and the central portion thereof is formed of the core layer resin material, whereby the smoothness of rotation and physical strength of the rotatable member is maintained and the very light weight resulting from the use of the resin materials can be achieved.

Particularly, according to the present invention, the rotatable member is formed by sandwich molding, whereby not only the ball race surface but also the tooth surface of the helicoid portion 10a of the inner peripheral surface of the rotatable ring can be formed of the skin layer resin material and the smoothness of meshing engagement thereof with the movable ring 2 can be increased.

Figure 6A:
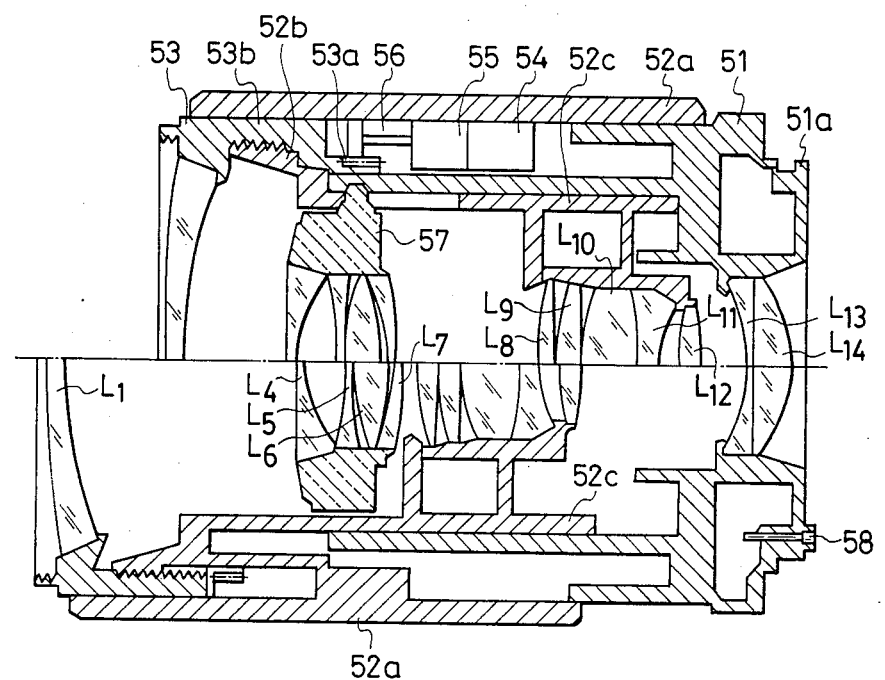
FIG. 6A is a cross-sectional view of a lens barrel according to an embodiment of the present invention.
Figure 6B:
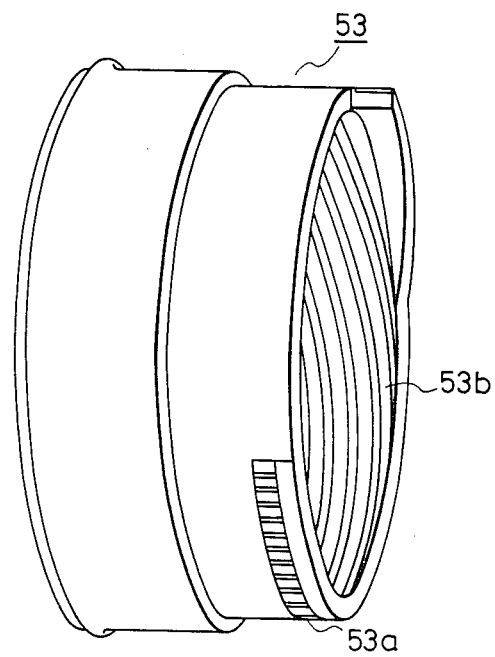
FIG. 6B is a perspective view of a lens holding member.

FIGS. 6A–6D show an example in which a lens barrel member having a toothed portion for receiving the rotational force from a drive source such as a motor is sandwich-molded. FIG. 6A is a cross-sectional view of a zoom lens barrel using the present invention, and the upper half of this figure shows the wide end state and the lower half shows the telephoto end state. FIG. 6B is a perspective view showing the essential portions of the lens barrel. In FIGS. 6A and 6B, reference numeral 51 designates a fixed lens barrel having at the rear end thereof a bayonet pawl 51a coupled to a camera. Reference character 52a denotes a zoom operating ring which is rectilinearly movable in the direction of the optic axis to effect a magnification changing operation. Designated by 52c is a rectilinearly movable cylinder integrally coupled to the zoom operating ring 52a.

Reference numeral 53 denotes a lens holding frame which holds a first group of lenses L1, L2 and L3 (with L1 being the only lens shown in the FIGS.; and Reference character 53b designates a helicoid thread which is threadably engaged with the helicoid thread 52b of the rectilinearly movable cylinder. Reference numeral 54 denotes a focus drive motor, and reference numeral 55 designates a speed reduction device. The motor 54 and the speed reduction device 55 are both fixed to the inner side of the zoom operating ring 52a. Reference numeral 56 denotes a focus drive gear which is engaged with the gear portion 53a of the lens holding frame 53. Designated by 57 is a member for holding a second group of lenses L4, L5, L6 and L7. A third group of lenses L8, L9, L10, L11 and L12 is held by the rectilinearly movable cylinder 52c. A fourth group of lenses L13 and L14 is held by the fixed cylinder 51a. Reference numeral 58 designates the power supply terminal of the motor 54. The power supply terminal 58 is connected to the motor by a flexible printed plate and therefore, there is no hindrance even if the motor is moved forward or rearward by zoom operation.

To zoom-operate from the wide end side to the telephoto end side, the zoom operating ring 52a may be grasped and pulled out forwardly, whereby the first group of lenses L1–L3 and the third group of lenses L8–L12 are rectilinearly moved as a unit to thereby accomplish a magnification change. At this time, the second group of lenses L4–L7 is moved by a minute amount to effect a correcting action. To accomplish focusing, the release button of the camera, not shown, may be depressed by a step, whereupon power is supplied from the battery of the camera to a focus control circuit and a focus control signal is applied to the motor 54 by way of the power supply terminal 58. Revolution of the motor 54 is transmitted to the focus drive gear 56 via the speed reduction device 55.

Rotation of the gear 56 is transmitted to the gear portion 53a of the lens holding frame 53, so that the first group of lenses L1–L3 is moved forwardly while being rotated by the action of the helicoid threads 53b and 52b. When the in-focus is reached, a focus drive stopping signal is output from the camera side to stop the drive motor 54.

Figure 6C:
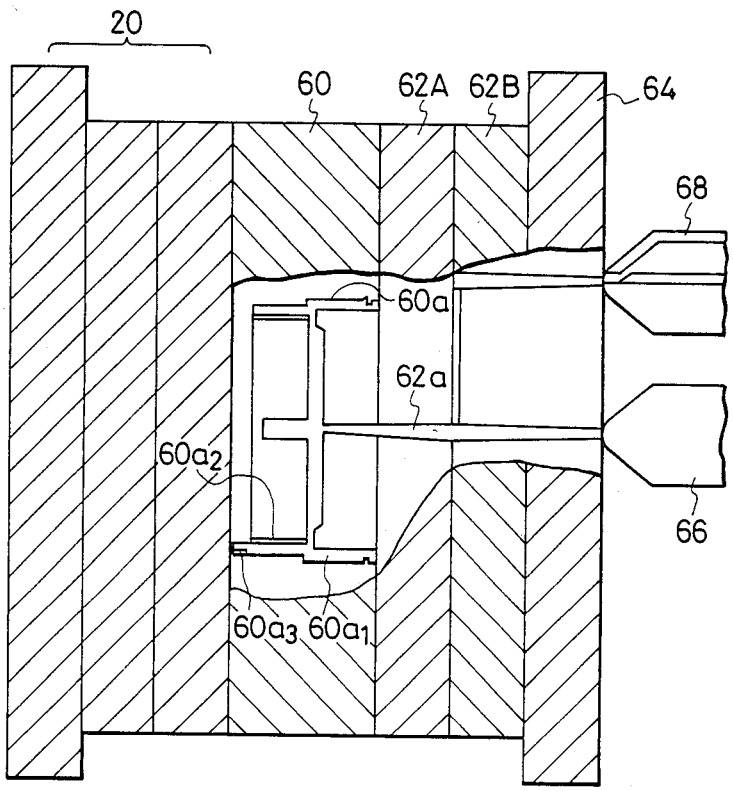
FIG. 6C is a broken-away view of the essential portions of a molding machine for molding the lens holding member shown in FIG. 6B.

FIG. 6B shows a perspective view of the lens holding member 53, and FIG. 6C shows the essential portions of a metal mold for the injection molding of the lens holding member 53. The inner peripheral surface of the lens holding member 53 is formed with a helicoid portion 53b threadably engaged with the helicoid 52b of the rectilinearly movable cylinder 52, and the outer peripheral surface of one end of this cylinder is provided with a toothed portion 53a which meshes with a gear.

In FIG. 6C, reference numeral 60 designates a mold member provided with a cavity 60a for the molding of the lens holding member 53, and reference characters 62A and 62B denote runner plates positioned between the mold member 60 and a fixed plate 64 and provided with runners 62a.

Reference numerals 66 and 68 designate first and second injection cylinders for injecting a core layer resin material and a skin layer resin material, respectively.

The cavity 60a of the mold member 60 is formed with a cylinder portion $60a_1$, for holding the lens of the lens barrel body, a helicoid portion $60a_2$ provided on the inner peripheral surface of the cylinder portion $60a_1$, and a toothed portion $60a_3$ provided on the outer peripheral surface of one end of the cylinder portion.

The molding by the apparatus of FIG. 6C will now be described. A skin layer resin material for forming the surface layer is first injected from the first injection cylinder 66. The skin layer resin material may suitably be 6 nylon, 66 nylon, POM (polyacetal), PC (polycarbonate) or PBT (polybutylene terephthalate).

When a predetermined volume of skin layer resin material has been injected, a core layer resin material for forming the central layer is injected from the second injection cylinder 68 through a sprue after the skin layer resin material in the mold.

The core layer resin material may suitably be polycarbonate containing glass fiber, polycarbonate containing carbon, or polyether imide.

Figure 6D:
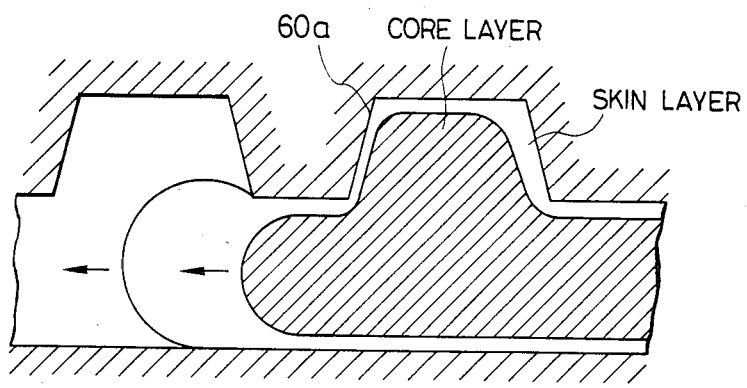
FIG. 6D illustrates the sandwich molding according to the present invention.

When the core layer resin material is injected into the cavity 60a into which the skin layer resin material has been injected, the core layer resin material pushes through the skin layer resin material and at the same time, it pushes out the skin layer resin material toward the outerperiphery of the cavity and pushes the latter forward in the cavity, as shown in FIG. 6D.

When a predetermined value of core layer resin material is injected, the skin layer resin material is positioned on the surface layer in the cavity 60a of the mold member and the core layer resin material is positioned inside the surface layer, and a molded article of sandwich-like cross-section in which the core layer resin is wrapped in the skin layer resin is formed.

The lens holding member of FIG. 6B is a lens holding member provided by the above-described molding, and the outer surface of this lens holding member 53 is the skin layer resin material and the inside thereof is the core layer resin material.

According to the present invention, there can be provided a lens holding member which holds a focusing lens or a zooming lens and receives the drive force from drive means such as a motor to accomplish focusing or zooming and which has its helicoid portion and toothed portion meshing with a gear formed of the skin layer resin material and has its cylinder base formed of the core layer resin material to thereby make the lens holding member suitable for motor drive. That is, according to the present invention, in the lens barrel of the structure as shown in FIG. 6A, the lens holding member 53 is helicoid-engaged with the rectilinearly movable cylinder 52 and further, the toothed portion 53a meshes with the gear 56.

The helicoid-coupled or gear-meshing portion is a part which produces noise during rotation due to the back-lash or the like of the meshing portion, but in the case of the present invention, the helicoid portion 53b or toothed portion 53a of the meshing portion is made of the skin layer resin material and therefore, even if the rectilinearly movable cylinder 52 or the gear 56 with which the helicoid portion or the toothed portion meshes is made of a metal or a hard resin material, production of noise such as shock noise or friction contact noise can be minimized.

Further, in the present invention, the skin layer resin material of the surface of the meshing portion is soft as compared with the inner core layer resin material and thus, the wear of the toothed portion and helicoid portion can be minimized.

Thus, an increase in back-lash can be prevented and further, malfunctioning during the auto-focusing operation can be minimized.

FIGS. 7A-7E show an example in which sandwich molding is used as the scale displaying function.

Electrical products, cameras and copying machines have the scale displaying function.

For example, a copying machine PPC has a density scale for selecting the copying density. FIG. 7D shows a density selecting portion in which the operating panel 1 of the copying machine body has an operating slider 2 and the sliding operation of the slider 2 may be adjusted to density indices $74a_1, 7a_2, \ldots$ to thereby set the density from a dark index $74a$ to a light index $74a_n$. FIG. 7E shows another example in which a scale 8 is displayed between density marks 6a and 6b and the plus button or the minus button of a density selecting button 10 may be depressed to move a movable index 12 on the scale 8.

The above-described scale displaying function is not restricted to the aforedescribed copying machine, but a similar construction is to be found in the exposure correction scale of a camera and the sound volume adjustment scale of an electrical product such as a television set or a video instrument.

A first object of the present invention is to provided a molded member in which the scale $74a_1, 74a_2, \ldots$, or 6a, 6b or 8 is integrally molded with an operating panel or the body case member of a copying machine, a camera or the like.

Particularly, the present invention has for its object to provide a multi-layer resin molded member in which the aforementioned scale display is integrally molded with a body member or the like by the use of the above-described sandwich molding technique.

The present embodiment will now be described in detail with reference to FIGS. 7A to 7E. In these figures, reference numeral 70 generally designates a molding member, and reference numerals 72 and 74 denote first and second injection units for injecting a skin layer resin material A and a core layer resin material B, respectively. Reference numeral 76 designates a fixed plate mounting member which is connected to the first and second injection units 72 and 74. Reference numeral 78 denotes a fixed plate mounted on the fixed plate mounting member 76 and having sprues 78a and 78b connected to the sprues 76a and 76b of the fixed plate and also having a sprue 78c which connects the sprues 78a and 78b. Reference numeral 80 designates a runner plate fixed to the fixed plate 78 and having a runner 80a connected to one end of the sprue 78b of the fixed plate 78.

Reference numeral 82 denotes a mold member having a cavity 82a for forming a molded article. Reference numeral 84 designates a movable plate. Reference numeral 86 denotes an inner core.

Figure 7A:
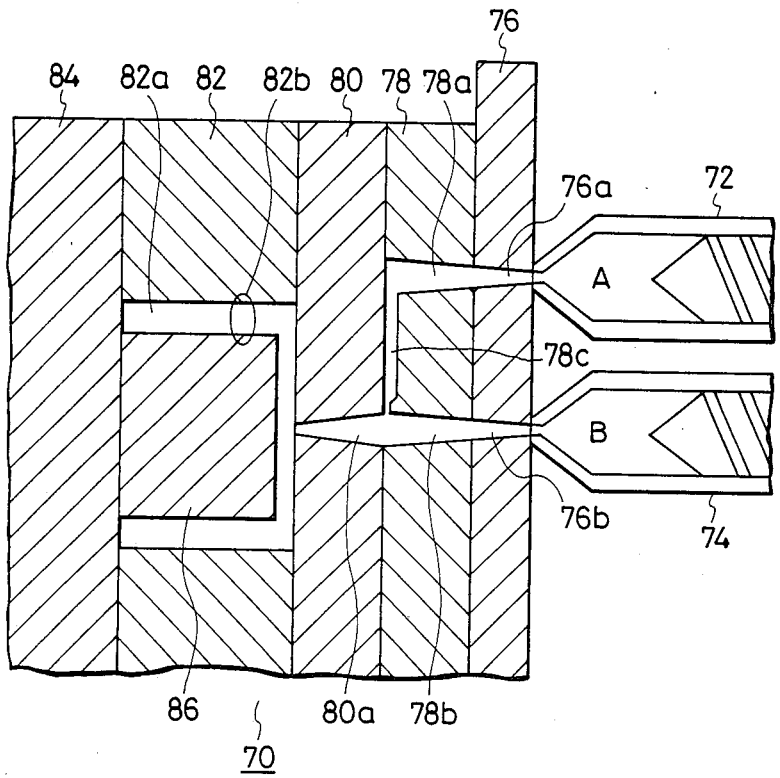
FIGS. 7A-7E show an embodiment of the present invention for changing the thickness of a skin layer resin material, FIG. 7A being a cross-sectional view of the essential portions of a molding machine, FIG. 7B being a fragmentary enlarged view of the mold of the molding machine, FIG. 7C being an illustration of the molding action, and FIGS. 7D and 7E illustrating the conventional scale display.
Figure 7B:
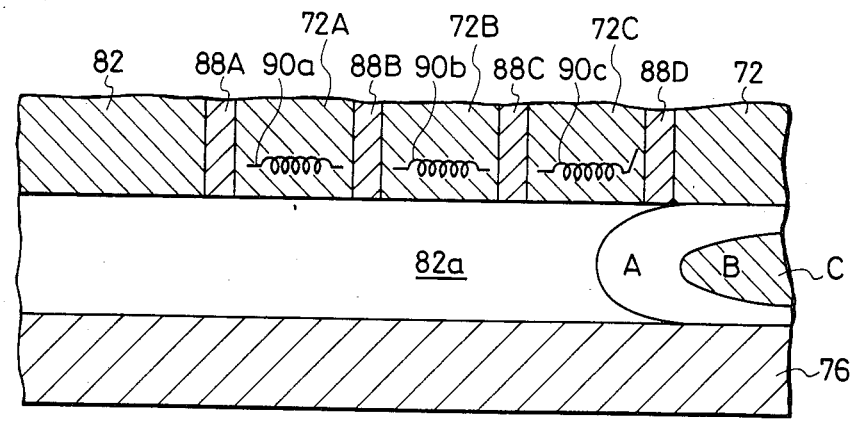

FIG. 7B shows the portion 82b circled in FIG. 7A, and is a fragmentary enlarged view of the mold.

Referring to FIG. 7B, on a portion of the peripheral wall of a cavity 82a, adiabatic members 88A, 88B, ... are interposed between the outside members of a template 82, and heaters 90a, 90b and 90c are respectively disposed in mold members 72A, 82B, and 72C forming the template. The heaters 90a, 90b and 90c have their heating temperatures controlled by a temperature controller, not shown, so that the temperatures $T_1$, $T_2$ and $T_3$ of the respective heaters 90a, 90b and 90c and the temperature t of the template 82 are in the relation that $t > T_1 > T_2 > T_3$.

The operation of the molding member of the described construction will now be described.

The skin layer resin material A is first injected from the first injection unit 72 into the cavity 72a through the sprue and runner.

The core layer resin material B is then injected from the second injection unit 74 into the cavity 72a. The core layer resin material B injected into the cavity 72a pushes forward the skin layer resin material A previously injected into the cavity 72a, by the injection pressure thereof, and further enters into the skin layer resin material A and advances so as to push out the skin layer resin material A toward the peripheral wall of the cavity 72a.

Figure 7C:
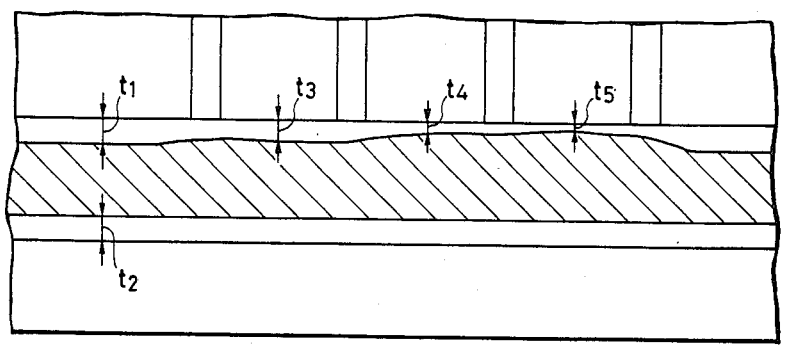
Figure 7D:
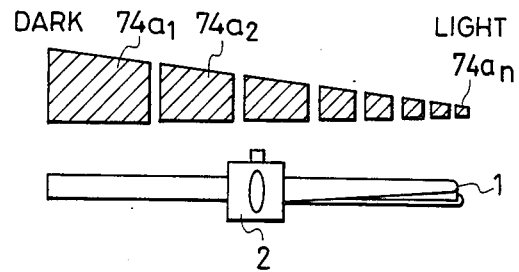
Figure 7E:
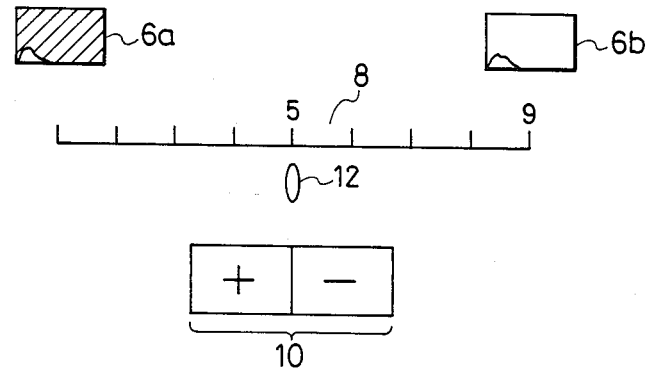

In FIG. 7C, the skin layer resin pushed forward through the cavity and pushed out toward the wall of the cavity by the injection of the core layer resin is further pushed forward while keeping contact with the peripheral wall of the cavity and at that time, it is subjected to the influences of the temperatures of the portions 72A-72C of the mold member shown in FIG. 7B. The core layer resin is injected at the injection temperature 300° C. of polycarbonate PC, and the temperature T of the core member 86 of the mold member 82 is set to 80° C.–100° C., the heating temperature $T_1$ of the heater 90a of the mold member 72A is set to 120° C., the heating temperature $T_2$ of the heater 90$b$ is set to 130° C., and the heating temperature $T_3$ of the heater 90 is set to 140° C., and the adiabatic members 88A, 88B, . . . are made of ceramics or asbestos. The skin layer resin A injected into the cavity, 72$a$ at the injection temperature of 300° C. is cooled and gradually loses its fluidity as its pushed against the peripheral wall of the cavity and pushed forward through the cavity, whereby it is solidified. Since the temperature $T_3$ of the mold member, 72C is higher than the temperature $T_2$ of the next mold member 72B, the cooling of the skin layer resin A is slower than the cooling of the mold member 82B. Therefore, the thickness $t_5$ of the skin layer resin A at the mold member 72C which is pushed out by the core layer resin B becomes smaller than the thickness $t_4$ of the skin layer resin at the mold member 72B, as shown in FIG. 7C. Further, the thickness of the skin layer resin A at the mold member 72A becomes greater than the thickness of the skin layer resin at the mold member 72B.

The skin layer resin having passed the mold members in which the heaters 90$a$, 90$b$ and 90$c$ are located is cooled and solidified by the cooling action of the temperature 80°–100° C. of the template in which no heater is disposed.

When the injection of the skin layer resin A and the core layer resin B into the cavity 72$a$ is completed, the mold is cooled and moved and the molded article is taken out of the mold.

Where the molded article produced by the above-described operation is, for example, the clad member of a lens barrel, the thickness of the skin layer resin of the cylinder portion changes in such a manner that $t_1 > t_3 > t_4 22$ $t_5$, and if polycarbonate is used as the skin layer resin material A and polycarbonate having glass fiber and carbon mixed therewith (PC+C+GF) is used as the core layer resin material B, the density of the core layer resin varies in conformity with the thickness of the skin layer, and this variation in density can be used in place of the aforedescribed dark and light scale display 74$a_1$, 74$a_2$, . . . of FIG. 7D or the dark and light display 76$a$, 76$b$ and index 8 of FIG. 7E.

As described above, according to the present invention, the thickness of the skin layer resin formed by sandwich molding is varied by temperature control to thereby vary the transmission density of the core layer resin material, whereby the molded member and the scale display portion can be molded integrally with each other. Thus, rationalization of the assembly of a copying machine, an electric instrument or the like can be expedited.

Also, shortening of the conventional process can be achieved without the necessity of printing or engraving density marks such as the aforementioned conventional scale display.

Figure 8A:
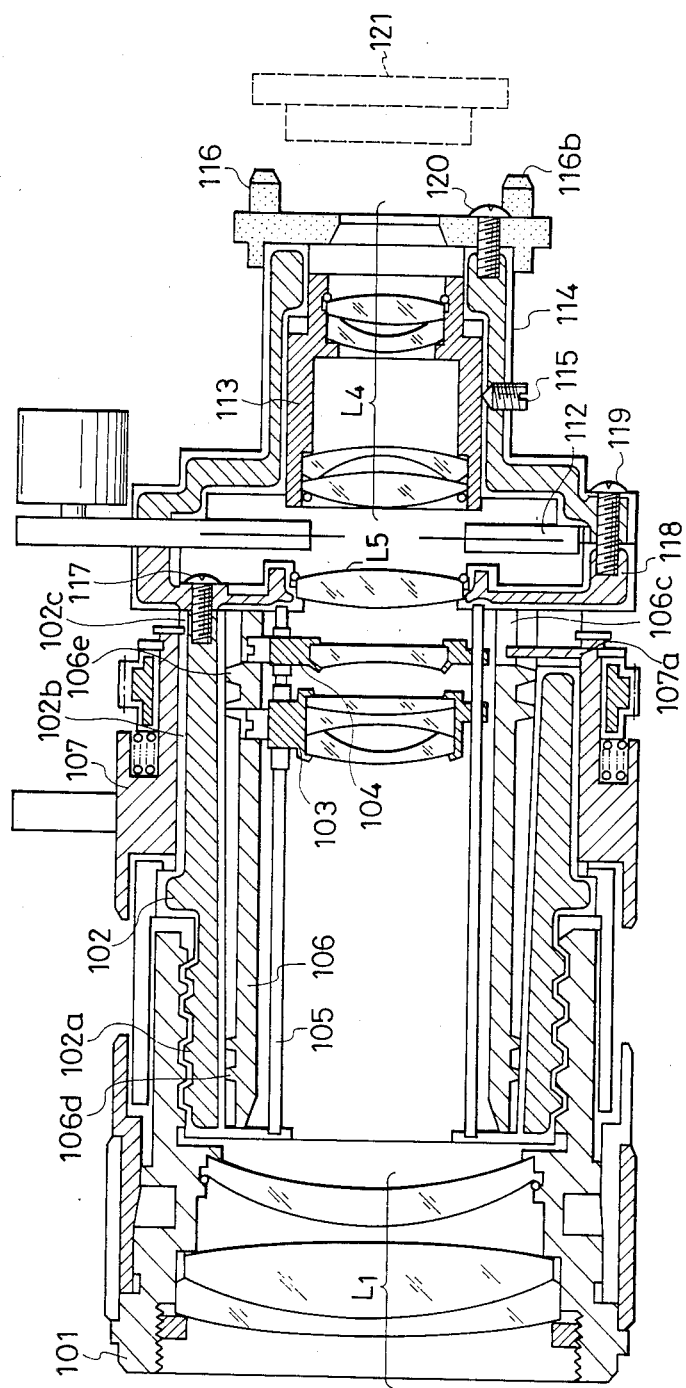

FIGS. 8A–8G3 show various examples of a multi-layer resin molded article which requires electrical conductivity.

A feature of a multi-layer resin molded article is that it is a resin molded article formed by the sandwich molding method so as to have as the layer structure a core layer consisting of an electrically conductive material and a skin layer consisting of an insulative material covering the surface of the core layer and also formed by said molding method so as to be provided with a lower hole for screw threading which presents an inner surface covered by the skin layer and in the lower hole for screw threading, the inner diameter of the core layer covered with the skin layer is made smaller than the outer diameter of the thread of a screw member threadably engaged with said lower hole.

The core layer in the above-described molded article has electrical conductivity and may of course have combined therewith, for example, glass fiber so as to have a property of high strength in addition.

As regards the resin materials forming the molded article as described above, the material for the core layer may be, for example, polycarbonate having glass fiber mixed therewith, and the material for the skin layer may be natural polycarbonate.

Some embodiments of the present invention will hereinafter be described in detail with reference to the drawings.

FIG. 8A shows the lens barrel structure of a camera constructed by the use of the molded article of the present invention.

Reference numeral 101 designates a focusing lens holder holding a focusing optical system L1, and the helicoid portion of a lens fixing barrel 102 is helicoid-coupled thereto. Reference numeral 106 denotes a zoom cam ring for displacing a V movable ring 103 and a C movable ring 104 held in the inner diameter portion thereof in the direction of the optic axis in accordance with zoom cam lift. The zoom cam ring 106 is fitted to the inner diameter portion of the lens fixing barrel 102 at the diametral fitting portions 106$d$ and 106$e$ thereof and is rotatable and slidable. Reference numeral 107 designates a zoom operating ring rotatably fitted to the lens fixing barrel 102 and adapted to transmit rotation of the zoom operating ring 107 to the cam ring 106 by the inner diameter side protrusion 107$a$ thereof being connected to the cut-away portion 106$c$ of the cam ring 106.

Reference numeral 118 denotes a relay cylinder holding an afocal lens L5 in the inner diameter portion thereof and thread-coupled to the lens fixing barrel 102 by means of a screw 117. Reference numeral 114 designates a rear fixed cylinder supporting therein a lens holder 113 which holds an imaging optical system L4 in the inner diameter portion thereof, and fastened to the relay cylinder 118 by means of a mounting screw 119.

Reference numeral 116 denotes a mount holder having a rear end surface 116$b$ to which an image pick-up element unit 121 may be attached, and coupled to the rear barrel by means of a mounting screw 120.

In the above-described construction, the lens fixing barrel 102 is a multi-layer resin molded article having a core layer 102$a$ and a skin layer 102$b$, and molded by using as the material of the core layer 102$a$ polycarbonate having 20% of carbon fiber and 10% of glass fiber combined therewith and using as the material of the skin layer 102$b$ polycarbonate having no said materials combined therewith.

The screw-secured portion of the lens fixing barrel 102 which is coupled to the relay cylinder 118 by means of the screw 117 has a feature that as shown enlarged in FIGS. 8B1 and 8B2, the screw 117 and the core layer 102$a$ can ensure electrical conduction by the self-tapping action during the screwing of the screw.

That is, a lower hole 102$d$ with which may be threadably engaged a screw for connection to the relay cylinder 118 is pre-formed at a suitable part of the rear end surface 102$c$ of the lens fixing barrel 102 during the sandwich molding.

On the other hand, the relay cylinder 118 is also molded by the sandwich molding method into a structure having a core layer 118$a$ formed of polycarbonate having carbon and glass fiber mixed therewith and a skin layer 118b formed of natural polycarbonate, and is formed with unloaded holes 118c for the mounting screw 117 at a plurality of locations. In the unloaded holes 118c of the relay cylinder 118, the core layer 118a is exposed simultaneously with the sandwich molding or by the working after the molding so that the electrical conduction with the screw 117 may be provided during the screwing of the screw 117. The circumferential shape of the lower hole 102d is made such that t<h, where t is the thickness of the skin layer on the inner surface of the lower hole and h is the height of the thread of the self-tap screw 117, and the inner diameter of the core layer in the lower hole 102d is made smaller than the diameter of the thread of the screw 117, whereby the screw 117 may be screwed into the lower hole 102d of the lens fixing barrel 102 so that the thread 117a of the screw 117 may break the skin layer 102b and eat into the core layer 102a of the lens fixing barrel 102 to secure electrical conduction with the layer 102a.

FIG. 8B2 shows the lens fixing barrel 102 and the relay cylinder 118 as they are coupled together by means of the screw 117, and also shows the state in which the core layer 102a of the lens fixing barrel 102 electrically conducts with the screw 117 through the thread 117a thereof and further the screw 117 electrically conducts with the core layer 118a of the relay cylinder 118.

In the same manner as the coupling structure between the lens fixing barrel 102 and the relay cylinder 118 as described above, a coupling structure which ensures electrical conduction through the screw 119 is provided between the relay cylinder 118 and the rear barrel 114.

FIGS. 8C1 and 8C2 show another example of the structure of the lower hole portion for screw threading of the molded article according to the present invention.

This example is an example in which the lower hole 150d for the screw of the sandwich-molded article is configured such that lugs such as 150a and 150b are provided at the opposite ends of the threaded hole 150d, as shown. This makes it possible to make the thickness t of the skin layer around the lower hole 150d smaller by increasing the space for escape of the skin layer material 150b during the injection of the core layer material 150a. FIG. 8C2 shows a state in which by the screw 151 being screwed in, the skin layer around the lower hole is broken by the thread 151a and the thread 151a eats into the core layer 150a to establish electrical conduction between the screw 151 and the core layer material 150a, and illustrates substantially the same state as that of FIG. 8B2.

The components of the above-described member will now be described in detail.

Referring to FIG. 8D1 which shows a molding apparatus used in the method of the present invention, reference numeral 141 designates a skin material injection cylinder, reference numeral 142 denotes a core material injection cylinder, reference numeral 143 designates a fixed side mounting plate, reference numeral 144 denotes a fixed plate, reference numeral 145 designates a runner plate, reference numeral 146 denotes a template, reference numeral 147 designates a movable side fixed plate, reference numeral 148 denotes a cavity provided in the template to mold a molded article, reference character 141a designates a skin sprue, reference character 142a denotes a core sprue, reference character 141b designates a bypass runner for connecting the skin sprue and the core sprue, reference character 142b denotes a runner, and reference numeral 149 designates a movable pin unit.

Referring to FIG. 8D2 which is a cross-sectional view of the movable pin unit, reference character 104k designates a spring for controlling the movable pin, and reference character 149c denotes a spacer for controlling a clearance t formed by the movable pin. The movable pin shown in FIG. 8D2 maintains a clearance t determined by the spring 104k and the spacer 149c when the skin material is poured in (the internal pressure is substantially zero when the skin material is poured in), and when the core material is subsequently poured in and the cavity begins to be filled, pressure is developed in the resin and therefore, by the resin pressure of the core material, a slide pin 149a begins to push up the spring 104k and the cavity is completely filled.

FIG. 8D3 shows a structure of the type in which the slide pin 149a is forcibly moved by an air cylinder 141a.

In such an apparatus, a suitable amount of skin material is first poured from the skin material injection cylinder 141 into the cavity 148 through skin sprue 141a, bypass runner 141b, core sprue 142a and runner 142b. The core material is then poured from the core material injection cylinder 142 into the cavity 148 through core sprue 142a and runner 142b while widening the skin material previously poured into the cavity, to completely fill the cavity, whereby a sandwich-molded article is shaped.

Subsequently, after the core material has been poured in and before the fluidity of the skin material is lost, the movable pin 149a is retracted out of the cavity 148, and the core material is caused to break the layer of the skin material and flow into a void formed by the retraction of the movable pin, whereby a desired exposed core portion can be formed.

FIGS. 8E1 and 8E2 are enlarged cross-sectional views illustrating such a movable pin portion and the movement thereof.

In FIG. 8E1, until an appropriate time elapses after the core material has been poured in, the movable pin 149a remains stationary while being in contact with a fixed pin 149b at a sliding surface 105a and keeping a clearance $T_1$. As soon as the core material is poured in or after a time of 0.6–1.5 sec. elapses after the skin material has been poured in, the movable pin 149a is moved while being guided by the fixed pin 149b as shown in FIG. 8E2 until a suitable clearance $T_2$ is provided, whereupon it is stopped. Due to this movement of the movable pin, the skin material which has flowed to the vicinity of the movable pin in the state of FIG. 8E1 cannot fill the clearance because the clearance is narrow and the flow resistance is great, and it flows to another portion of small flow resistance, but after the movable pin has been moved and the clearance has been widened, the flow resistance of the core material in said portion decreases to permit the core material to flow thereinto and break the small amount of skin material previously poured into the vicinity of the movable pin, thereby forming a portion in which the core material is exposed.

EXAMPLE

Skin material: polycarbonate
Core material: polycarbonate (containing 30% of carbon fiber and 10% of aluminum fiber)
Temperature of skin material: 320° C.
Temperature of core material: 330° C.
Temperature of metal mold: 110° C.

Injection speed of skin material: 10 m/sec.
Pouring time: 0.6 sec.
Injection speed of core material: 3 m/sec.
Pouring time: 1.8 sec.
Movable pin movement starting time: 0.4 sec. after pouring of core material has been started
Completion of movable pin movement: 1.0 sec. after pouring of core material has been started
Movable pin operating source: air cylinder
Resin pressure at the time of pouring of skin material: 3 kgf/cm$^3$
Resin pressure at the time of pouring of core material: 950 kgf/cm$^3$
Thus, a molded article of sandwich structure has been molded.

Referring to FIG. 8F which is a cross-sectional view of the portion of the thus molded article which is near the movable pin, reference character 106a designates a skin layer, reference character 106b denotes a core layer, and reference numerals 161, 162 and 163 designate the exposed portions of the core material.

Although a lens barrel member has been used in the present embodiment, the application of the present invention to the housing of a copying machine, a word processor, an electronic desk-top calculator or a computer can be achieved by a similar method.

FIGS. 8G1-8G3 show another embodiment in which the core layer is exposed on the front and back surfaces of the molded article.

That is, in this embodiment, a solid bar-like movable pin 171 is moved to the states of FIGS. 8G2 and 8G3 in the same manner as in the previously described embodiment after an appropriate time has elapsed after the pouring of the core material succeeding to the pouring of the skin material, and in a manner of filling similar to that shown in FIG. 8E1, there is provided a molded article in which the core layer is exposed on the front and back surfaces 172 and 173 thereof as shown in FIG. 8G3. The molded article shown in FIG. 8G1 is very effective to earth it or to achieve conduction by joining the surfaces together without using a screw.

As described above, in the metal mold used with sandwich molding is effected, a movable pin is provided in the desired portion of the molded article wherein conduction or earthing is desired, and after the lapse of an appropriate time during the pouring of resin, the movable pin is moved, whereby the core layer can be exposed in a predetermined portion of the sandwich-molded article comprising the skin layer and the core layer and as a result, forming apertures in the molded article or cutting and removing part of the molded article to partly expose the core layer as has heretofore been done becomes unnecessary, and thus it has become possible to provide a sandwich-molded article which has a beautiful appearance and which does not require any working after molding.

What I claim is:

1. A cylindrical shaped resin molded member comprising:
   meshing means for receiving a drive force, said meshing means formed on an outer peripheral surface of said molded member and having a sandwich-molded structure wherein a central portion is formed by a core layer resin material and is surrounded by a skin layer resin material, said meshing means having a front side which is in direct contact with the driving force, and a rear side, and wherein the thickness of said skin layer on said front side is less that the thickness of said skin layer on said rear side.

2. A lens assembly comprising:
   a fixed cylinder;
   motor means for transmitting a driving force;
   a transmitting member for receiving the driving force from said motor means;
   a rotatable cylinder driven by said transmitting member, said rotatable cylinder having a helicoid portion and a groove portion for supporting ball bearings disposed between said fixed cylinder and said rotatable cylinder, said rotatable cylinder being sandwich-molded and having a central portion and an outer peripheral portion, wherein said central portion comprises a core layer material mixed with reinforcement material and said outer peripheral portion surrounding said central portion is formed by a skin layer material without said reinforcement material, with an outer surface of said groove portion and said helicoid portion being covered with said skin layer material; and
   a moving cylinder having a helicoid portion for meshing with said helicoid portion of said rotatable cylinder, said rotatable cylinder being sandwich-molded so that a central portion thereof is formed by a core layer material mixed with reinforcement material and an outer peripheral portion surrounding the central portion is formed by a skin layer material without said reinforcement material, and contact surfaces of said helicoid portions in said rotatable cylinder and said moving cylinder being formed by said skin layer material.

3. A structural body having at least first and second resin molded members being electrically connected, comprising:
   a connecting member for connecting said at least first and second resin molded members, said connecting member being made with electroconductive material and having a threaded portion;
   said first resin molded member having a central portion formed by an electroconductive core layer resin material and an outer peripheral surface formed by a nonconductive skin layer resin material, and a through-hole being defined at a portion in said first molded member; and
   said second resin molded member having a central portion formed by an electroconductive core layer resin material and an outer peripheral surface being formed by a nonconductive skin layer resin material, said second resin member defining a bore for receiving a connecting member at a connecting surface to said first resin molded member, and a thickness of said skin layer defining said bore being less than the height of said threaded portion of said connecting member;
   said structural body being assembled by screw-connecting said connecting member to the through-hole in said first resin molded member and to the bore in said second resin molded member for maintaining electrical conductivity between the core layer material in said first and second resin molded members.

* * * * *

UNITED STATES PATENT AND TRADEMARK OFFICE
CERTIFICATE OF CORRECTION

PATENT NO. : 4,805,991

DATED : February 21, 1989

INVENTOR(S) : Takashi Arai, et al.

It is certified that error appears in the above-identified patent and that said Letters Patent is hereby corrected as shown below:

COLUMN 1:

Line 19, "helocoid" should read --helicoid--.

COLUMN 2:

Line 16, "members can" should be deleted.

Line 17, "be automatically attained accompanying other" should be deleted.

COLUMN 6:

Line 66, "in" should be deleted.

COLUMN 7:

Line 49, "Figs; and Refer-" should read --Figs); and refer--.

UNITED STATES PATENT AND TRADEMARK OFFICE
CERTIFICATE OF CORRECTION

PATENT NO.  : 4,805,991
DATED       : February 21, 1989
INVENTOR(S) : Takashi Arai, et al.

It is certified that error appears in the above-identified patent and that said Letters Patent is hereby corrected as shown below:

COLUMN 9:

Line 67, "provided" should read --provide--.

COLUMN 10:

Line 36, "82B," should read --72B,--.

COLUMN 11:

Line 33, "$t_1 > t_3 > t_4\ 22\ t_5,$" should read --$t_1 > t_3 > t_4 > t_5$--.

COLUMN 15:

Line 58, "What I claim is:" should read --What we claim is:--.

UNITED STATES PATENT AND TRADEMARK OFFICE
CERTIFICATE OF CORRECTION

PATENT NO. : 4,805,991
DATED : February 21, 1989
INVENTOR(S) : Takashi Arai, et al It is certified that error appears in the above-identified patent and that said Letters Patent is hereby corrected as shown below:

COLUMN 16:

Line 4, "that" should read --than--.

Signed and Sealed this

Thirtieth Day of January, 1990

Attest:

JEFFREY M. SAMUELS

Attesting Officer     Acting Commissioner of Patents and Trademarks